United States Patent [19]
Kuperstein et al.

[11] Patent Number: 6,128,398
[45] Date of Patent: Oct. 3, 2000

[54] SYSTEM, METHOD AND APPLICATION FOR THE RECOGNITION, VERIFICATION AND SIMILARITY RANKING OF FACIAL OR OTHER OBJECT PATTERNS

[75] Inventors: Michael Kuperstein, Wellesley; James A. Kottas, West Newton, both of Mass.

[73] Assignee: Miros Inc., Wellesley, Mass.

[21] Appl. No.: 09/020,443

[22] Filed: Feb. 9, 1998

Related U.S. Application Data

[63] Continuation of application No. 08/382,229, Jan. 31, 1995, abandoned.

[51] Int. Cl.$^7$ .................................................. G06K 9/00
[52] U.S. Cl. ................................... 382/118; 382/116
[58] Field of Search ................................... 382/116, 117, 382/118

[56] References Cited

U.S. PATENT DOCUMENTS

| | | | |
|---|---|---|---|
| 4,975,969 | 12/1990 | Tal ........................................... | 382/116 |
| 5,056,147 | 10/1991 | Turner et al. ............................ | 382/159 |
| 5,161,204 | 11/1992 | Hutcheson et al. ..................... | 382/157 |
| 5,199,081 | 3/1993 | Saito et al. .............................. | 382/116 |
| 5,432,864 | 7/1995 | Lu et al. .................................. | 382/118 |

*Primary Examiner*—Yon J. Couso
*Attorney, Agent, or Firm*—Donald L. Wenskay

[57] ABSTRACT

A system and method is disclosed for determining the likelihood that two object patterns arise from the same object source. It is able to do this without having previously been exposed to either of the object patterns. This system utilizes an adaptive processor trained to make this determination using a large number of example patterns in different views and orientations. It accommodates large verifications of how an object source is presented in an image. The system also does not require the storage of any information about any particular pattern, which greatly minimizes the storage requirements and improves the throughput of the system. Further, there is no need for accessing a database of previously stored features from a given pattern source. The system is particularly useful for object patterns which consist of facial images. The system employs a new technique for locating an object of interest within a pattern using an adaptive processor to determine a region of interest. The technique is resistant to irrelevant overlapping patterns. The system and method of the present invention employ a technique for performing authentication of the validity of a card or a user's image on a computer network system which has a user's face image stored within. Finally, this invention provides a new technique for naturally aligning the face. This technique, which is convenient to use and yields candid shots, is useful in facial verification.

12 Claims, 7 Drawing Sheets

SYSTEM, METHOD AND APPLICATION FOR THE RECOGNITION, VERIFICATION AND SIMILARITY RANKING OF FACIAL OR OTHER OBJECT PATTERNS

This application is continuation of Ser. No. 08/382,229 now abandoned.

BACKGROUND OF THE INVENTION

1. Technical Field

The present invention relates to object recognition systems and more particularly to a neural network based system and method for verifying a match between two objects patterns.

2. Discussion

The task of automatic object recognition represents one of the major challenges to modern computational systems. One frequently encountered problem in object recognition is the task of recognizing a match between a known and an unknown object. One example of this problem occurs in the field of face recognition. In many applications it would be desirable to have a system which can compare a previously acquired image of a face with a "live" image to determine if the two facial images are those of the same person or not.

This task of facial matching is fraught with difficulties due to the many unpredictable differences which may occur between the previously stored facial image and the live image. For example, these differences may include one or more of the following: mis-registration between the two images, resulting from differences in the height of the face or the tilt of the head etc.; different lighting conditions which will result in different shadows which greatly affects the contrast distribution of the pattern of the eyes and the face; changes in the individual's appearance due to different hairstyles, make-up, jewelry, facial hair, facial expressions, etc.; different background clutter in the image; the facial images may be turned to the side which greatly affects the appearance of facial features.

Because of these and other variations it is very difficult for existing computational systems to recognize when two facial images are from the same person. Some progress has been made in this area by adaptive systems, such as neural networks which have demonstrated an ability to generalize facial features based on training examples despite the above-described kinds of variations. One example of a neural network system of this sort is French Patent No. 2,688,329 issued to B. Anjeniol. Even so, there has still not been satisfactory performance by neural network systems for facial recognition where the variations in the images are as large as those encountered in real-life applications.

For example, in some approaches the system will find features, such as eyes, nose, mouth, etc. and then determine facial recognition using the ratios of those features in a neural network. However, since not all features are well-defined and since the features change with different facial orientations and different facial expressions, these ratios also change with the different orientations and expressions. As a result, systems of this sort are not always reliable when confronted with different orientations and expressions.

Another approach utilizes an approach called eigenfaces. Eigenfaces are facial features used to discriminate features of one face from those of another. In this approach, an average face is derived and the difference from a target face are determined in terms of the eigenfaces. For additional information about this and other techniques see the article "Face Value", Byte, February 1995, page 85–89, which is herein incorporated by reference.

However the eigenfaces approach is sensitive to changes in head orientation and lighting conditions because it uses the difference between the target face and the average of all faces as its primary means of comparison.

An additional problem with prior face recognition systems has been one of storage capacity and through-put. With regard to storage capacity, where it is desired to recognize a large number of different faces, the volume of information that needs to be stored can be very large. Even with the use of data compression techniques, facial recognition systems which rely on stored information about known faces when making comparisons with the live face can require an impractical amount of storage space for applications where a reasonably large number of faces need to be recognized.

A related problem is the excessive computational time required to perform an analysis of facial images to determine whether a match is present. Many conventional techniques require massive computational capabilities and/or long computational time to perform the required analysis of the images. Though-put is a problem in many applications where access to a system is required very rapidly and long delays for analysis of facial images cannot be tolerated.

Furthermore, even before a match between test and reference facial images can be attempted, an accurate location of the face must be determined. This task is problematic due to the aforementioned variations in the image. Particularly difficult is the task of locating the face amid background clutter and variable amount of hair on the head.

Thus it would be desirable to provide a system and method for accurately determining the location of a face in an image having background clutter.

It would also be desirable to provide a system and method for accurately performing facial recognition which does not require the storage of a large database and which also does not require excessive computational time.

SUMMARY OF THE INVENTION

Pursuant to the present invention, a system and method for locating an object pattern and performing matching of object patterns is provided. In the preferred embodiment the present invention is adopted to operate on object patterns which consist of facial images. The system is able to analyze reference and live facial images and determine if the two images are from the same person or not. It is able to do this without having previously seen either of the facial images. The system utilizes a neural network which is trained to recognize matching facial images using a large number of example faces in different views and orientations. Once trained, the system is able to recognize when two facial images are from the same person without ever having been previously trained with the facial image of that particular person. Thus, the system does not require storage of any information about the particular individual's face. This greatly minimizes the storage requirements of the system. Furthermore, through-put is maximized because there is no need for accessing a database of previously stored features from an individual's face, and also because of the parallelism of the neural network approach of the present invention.

In accordance with one aspect of the present invention, a method is provided for verifying that two facial images are from the same person. The method includes the steps of receiving reference and test facial images, the reference facial image being from a known face and the test facial image being from an unknown face. Reference and test feature sets are then derived from the corresponding facial images. Each element in each of the feature sets is then assigned to a look-up table of weights that is quantized by the amplitude of the feature element in a corresponding reference and test weight set in a neural network, wherein each weight set comprises a plurality of weights which correspond to each element in the feature set. An output of the neural network is then determined by calculating the dot product normalized by weight vector length of the assigned weights in the two respective weight sets. The system then compares the results of the dot product output to a threshold, wherein an above threshold output indicates that the facial images are from the same person, and a below threshold output indicates that the two facial images are from different persons.

In order to derive the correct weights for performing this method, the method in accordance with present invention undergoes a prior learning process which includes the steps of generating a set of training test feature sets and training reference sets. The training test and reference feature sets are derived from different images of a plurality of known facial images. The feature sets are processed as described above for the training test and reference feature sets. When the output is correct the weights remain unchanged. When the output is above threshold and the test feature sets are from different faces, the value of the assigned weights of the test and reference weight vectors are adjusted to be farther apart from each other. If, on the other hand, the results are below threshold for facial images which originate from the same face the weights are adjusted to be closer to each other.

In accordance with another aspect of the present invention, a system is provided for verifying that two facial images are from the same person. The system is adapted to implement the above-discussed method.

As a result, the present invention provides a system and method for verifying a match between two facial images. The system is able to verify facial matches to a high degree of accuracy while tolerating a wide range of variations in the images including modifications of hair, make-up, facial expression and orientation. The present invention accomplishes all this with a very minimal storage requirements and with rapid throughput thus making it practical for many applications where a large number of different faces must be verified quickly.

BRIEF DESCRIPTION OF THE DRAWINGS

The various advantages of the present invention will become apparent one skilled in the art by reading the following specification and by reference to the following drawings in which.

DETAILED DESCRIPTION OF THE PREFERRED EMBODIMENTS

The present invention is a system, method and application for the recognition, verification and similarity ranking of facial or other object patterns. While the techniques of the present invention have many applications in the general area of object recognition, they are particularly well suited to the task of face recognition. This task poses numerous difficulties particularly where many variations can be expected in the appearance of the facial image to be recognized. The techniques of the present invention result in a system which can verify a match between two facial images where significant differences may occur between the images.

Figure 1:
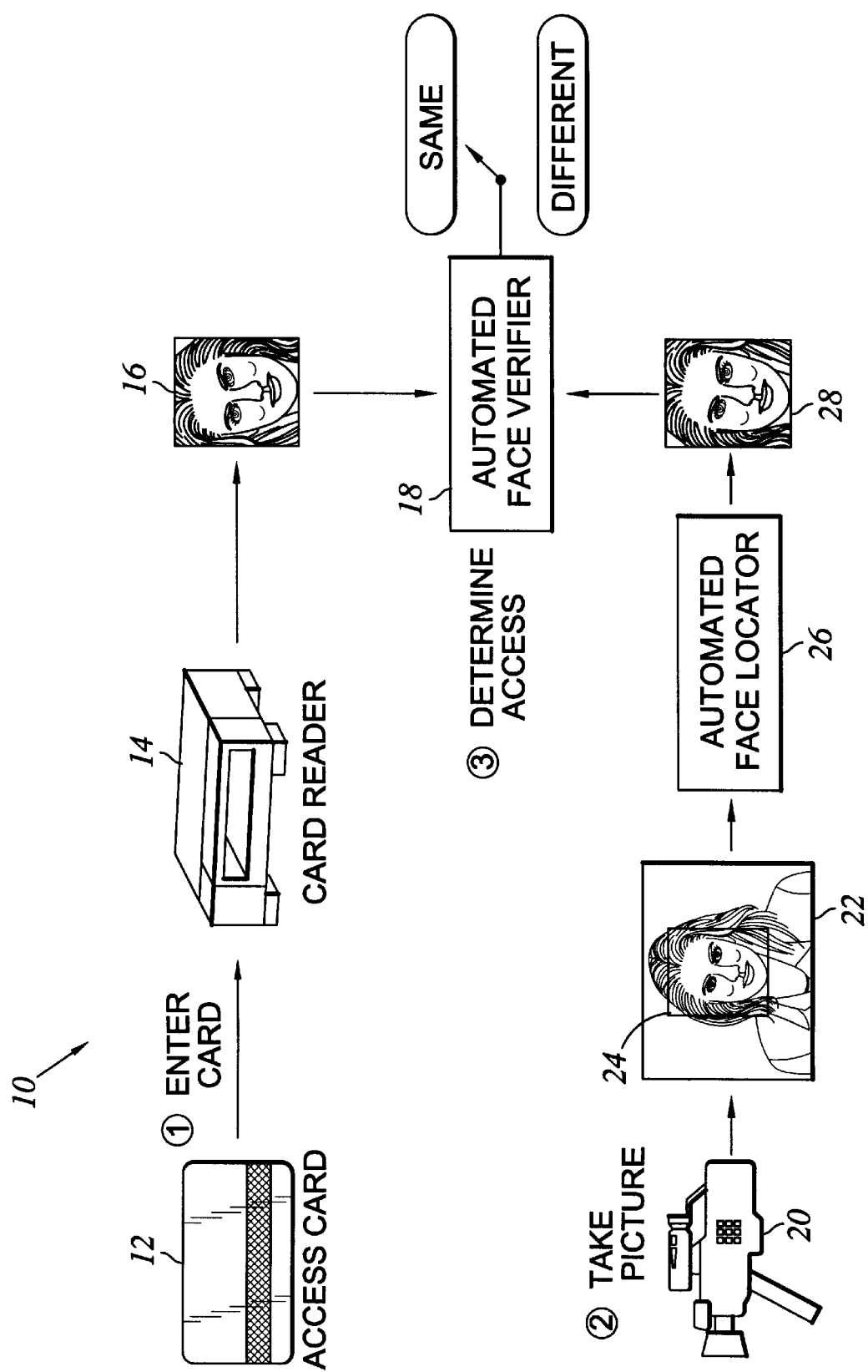
FIG. 1 is a diagram of a preferred embodiment of the system of the present invention which determines whether the face of a user of an access card matches a previously recorded image of the known user's face.

Referring now to FIG. 1, an overall functional diagram of a preferred embodiment of the present invention is shown. In this system, a user desires access to some entity. This entity may comprise a computer network, an automated teller machine (ATM), access to a building, etc. Initially the user of this face verification system 10 in accordance with the present invention enters an access card 12 into a card reader 14. The card reader generates an output comprising a previously stored reference image of the user's face 16. It should be appreciated that this previously stored image may be imprinted on the access card and/or may be stored in a database (not shown) accessible to the card reader 14.

The resulting reference image is shown in FIG. 1 as image 16. This image may comprise, for example, a 100 pixel high by 80 pixel wide digitized image of the known user's face. This digitized image is then input into the automated face verifier 18 of the present invention. It will be appreciated that in the preferred embodiment shown in FIG. 1, utilizing the access card 12, the digitized reference image 16 will be input into the automated face verifier 18 each time access is required. In another embodiment a database containing all of the possible known reference facial images may be stored and will be accessed by the automated face verifier by an index code each time verification is required.

A camera 20 acquires an image of the individuals desiring access. This person will either present an access card 12 with his/her image on it or will have had his/her image previously stored in the database accessible to the verifier 18. The camera 20 produces an image 22 which includes, for example, the entire head and shoulders of the individual. In accordance with a process described in more detail below, this image is adaptively clipped to include just the immediate area of the individual's face to yield a clip 24 which is the same size as the reference image 16.

This clip image 24 is then transferred to an automated face locator 26 which performs the function of registering the position and orientation of the face in the image 24. In accordance with a technique which will be described in more detail below, in the preferred embodiment of the present invention the location of the face is determined in two phases. First, the clip image 24 is found by defining a bounding box at its perimeter. The location of the bounding box is based on a number of features. Second, the location of the individual's eyes is determined. Once the location of the eyes is determined, the face is rotated about an axis located at the midpoint (gaze point) between the eyes to achieve a precise vertical alignment of the two eyes. The purpose of the automated face locator 26 is to achieve a relatively precise alignment of the test image 24 with the reference image 16. It will be appreciated that an automated face locator 26 will also be used to locate the face in the test image 16. It should be noted that the adaptive automated face locator 26 is needed to locate the face in the test and reference image 16, because with standard (nonadaptive) image processing techniques, the derived outline of the face will necessarily include the outline of the hair. However in accordance with the present invention the clip image 24 defined by the bounding box will not include the hair.

In any event, it is important that the resulting test image 28 be accurately registered with respect to the reference image 16. That is, in accordance with the preferred embodiment described in more detail below an accurate location of the eyes is determined for the reference image 16 and an accurate location for the eyes is determined for the test image 24. The two images are then registered so that the location of the midpoint between both eyes are registered in both images. This is important because the automated face verifier 18 will be attempting to determine whether the two images are those of the same person. If the two images are misregistered, it is more likely to incorrectly determine that the two images of the same person are from different persons because similar features will not be aligned with similar features.

The automated face verifier 18 receives the clipped and registered reference image 16 and test image 28 and makes a determination of whether the persons depicted in the two images are the same or are different. This determination is made using a neural network which has been previously trained on numerous faces to make this determination. However, once trained, the automated face verifier is able to make the verification determination without having actually been exposed to the face of the individual.

Figure 2:
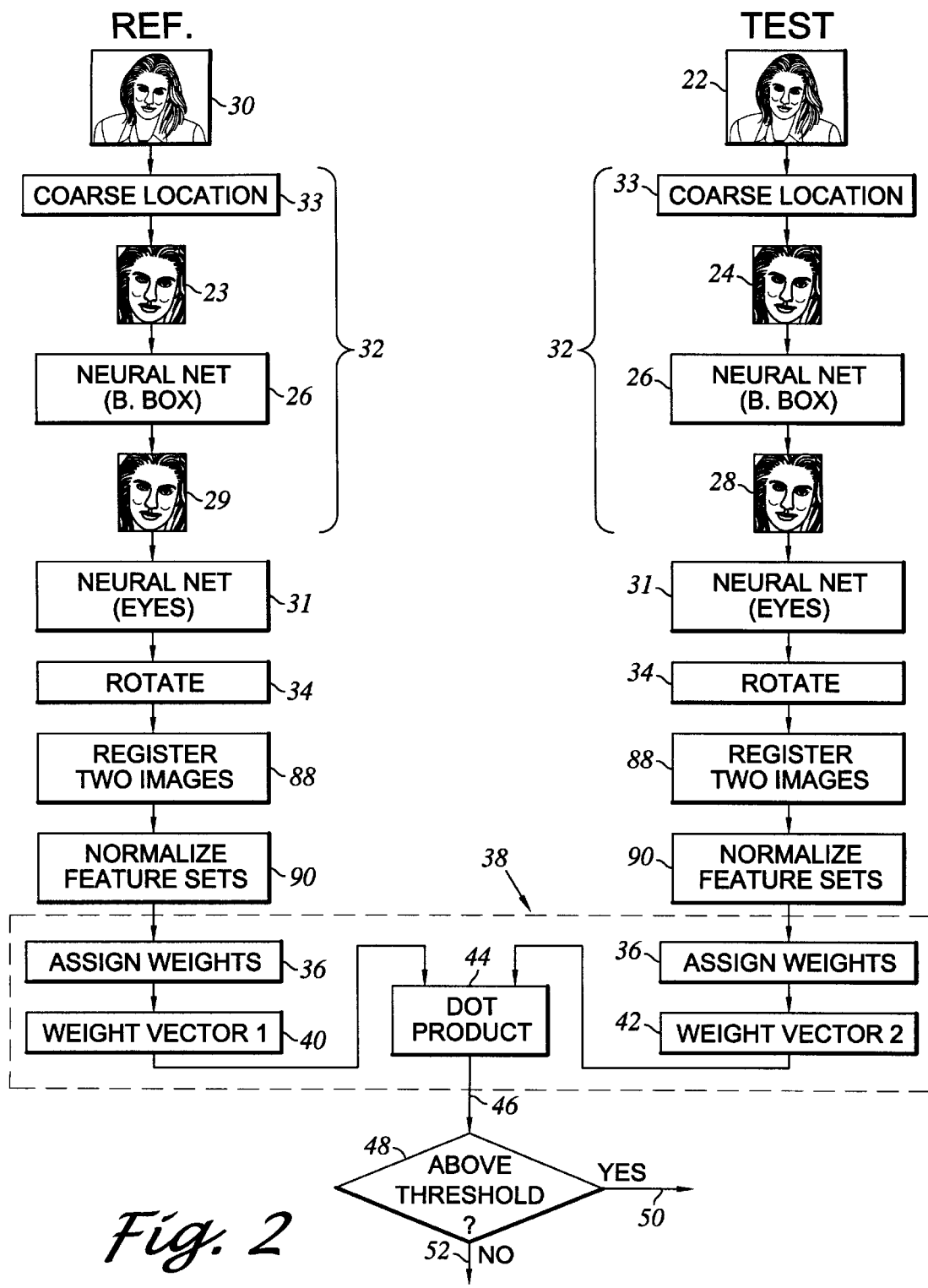
FIG. 2 is a diagram of the major steps performed by the face verification system in accordance with a preferred embodiment of the present invention.

Referring now to FIG. 2, a diagram of the generalized process of face verification in accordance with the present invention is shown. Initially a test image 22 and a reference image 30 are acquired. These images are then both processed by a clip processor 32 which defines the bounding box containing predetermined portions of each face. It will be appreciated that, in general, the reference prerecorded image may be stored in various ways. The entire image of the previous facial image may be recorded as shown in the image 30 in FIG. 2, or only a previously derived clip 16 may be stored. Also, a clip that is compressed in a compression method for storage may be stored which is then decompressed from storage for use. In addition, some other parameterization of the clip 16 may be stored and accessed later to reduce the amount of storage capacity required. The prerecorded image could be stored on a access card as shown in FIG. 1 or on a smartcard consisting of magnetic media, optical media, two dimensional barcode media or active chip media. Alternatively, the prerecorded image may be stored in a database as discussed above.

The reference and test images 22, 30 are then clipped. This occurs in two stages. First, a coarse location is found in step 33. This yields the coarse location of the image shown in Blocks 23 and 24. Next, a first neural network 26 is used to find a precise bounding box shown in Blocks 28 and 29. In a preferred embodiment the region of this bounding box 28 is defined vertically to be from just below the chin to just above the natural hair line (or implied natural hair line if the person is bald or wearing a hat). The horizontal region of the face in this clipping region is defined to be between the beginning of the ears at the back of the cheek on both sides of the face. If one ear is not visible because the face is turned at an angle, the clipping region is defined to be the edge of the cheek or nose, whichever is more extreme. This process performed by chip processor 32 will be described in more detail below in connection with FIG. 3.

Next, a second neural network 30 is used to locate the eyes. The image is then rotated in step 34 about a gaze point as described in more detail in FIG. 4. The above steps are repeated for both the reference and the test images. The two images are then registered in step 88, using the position of the eyes as reference points.

Next, the registered images are normalized in step 90. This includes normalizing each feature value by the mean of all the feature values. It should be noted that the components of the input image vectors represent a measure of a feature at a certain location, and these components comprises continuous valued numbers.

Figure 5:
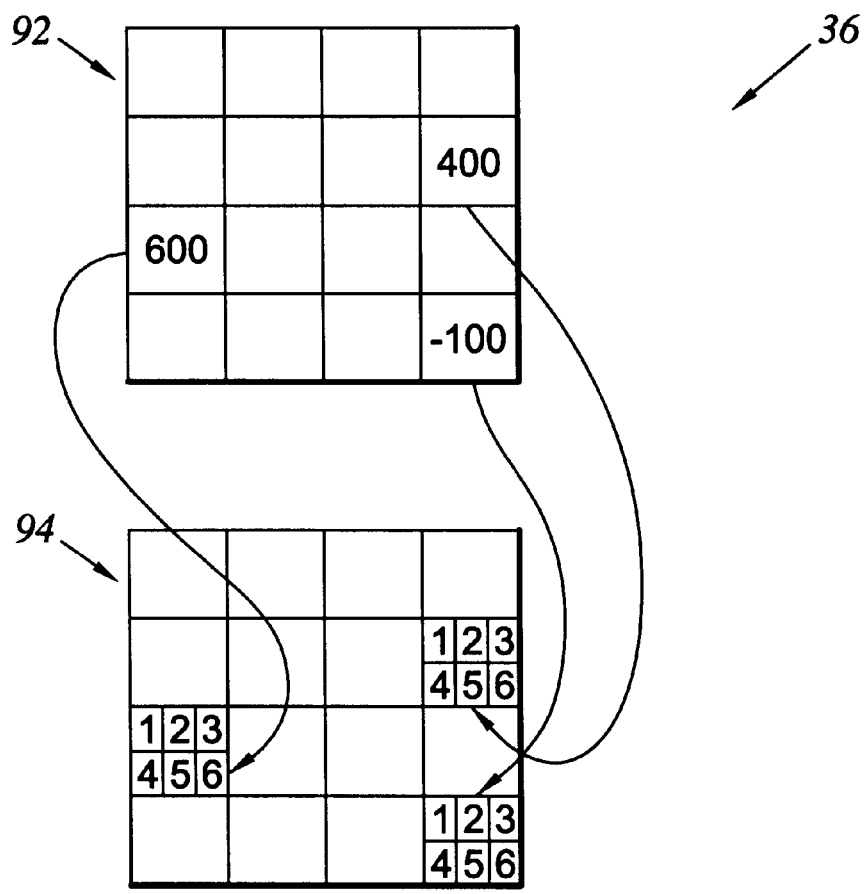
FIG. 5 is a diagram showing additional details of the process of selecting weights in accordance with the present invention.
Figure 5:
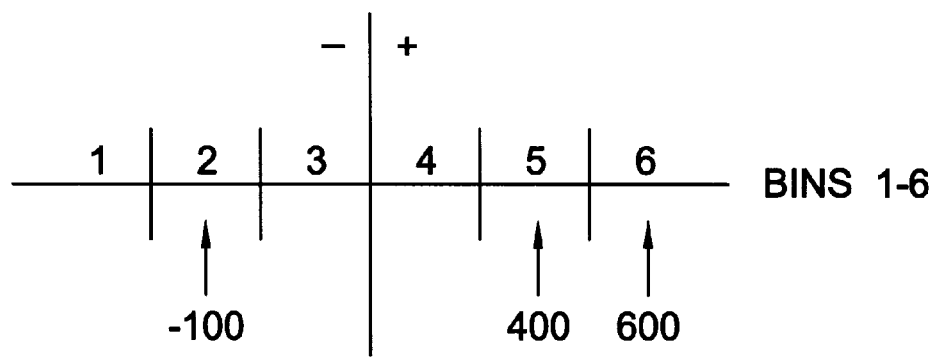

Next, a third neural network 38 is used to perform the verification of the match or mismatch between the two faces 22, 30. First, weights are assigned in block 36, as described in more detail connected with in FIG. 5. It should be noted that the location of the weights and features are registered. Once the weight assignments are made the appropriate weights in the neural network 38 are selected. The assigned reference weights comprise a first weight vector 40 and the assigned test weights comprise a second weight vector 42. The neural network 38 then determines a normalized dot product of the first weight vector and the second weight vector in block 44. This is a dot product of vectors on the unit circle in N dimensioned space, wherein each weight vector is first normalized relative to its length. A well-known technique for normalizing such vectors is used in vector quantization, which is commonly used in connection with Kohonen neural networks. For further details with respect to normalization and related Kohonen neural networks see Wasserman, Neural Computing Theory and Practice, Van Nostrand Reinhold (1989). pp. 63–71 and pp. 201–209 which is incorporated in its entirety herein by reference.

The result is a number which is the output 46 of the neural network 38. This output is then compared to a threshold in decision step 48. Above threshold outputs indicate a match 50 and below threshold outputs indicate a mismatch 52.

Figure 3:
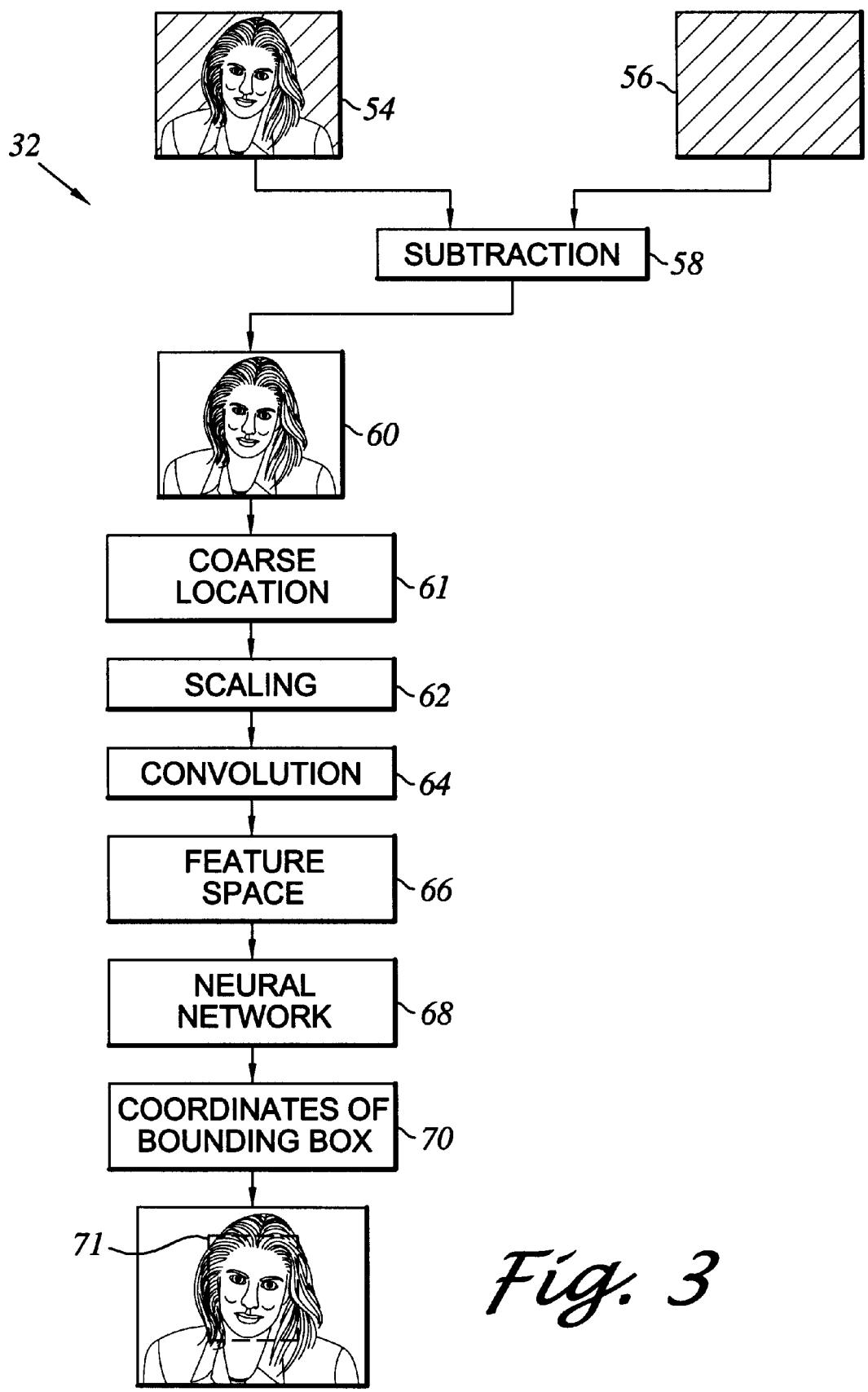
FIG. 3 is a diagram of the major steps involved in deriving a facial image bounding box in accordance with the present invention.

The above process will now be described in more detail. Referring to FIG. 3, the clip process 32 is shown. An acquired image 54 may comprise either the test or the reference image. This image includes the face of the subject as well as additional portions such as the neck and the shoulders and also will include background clutter. An image substraction process is performed in accordance with conventional techniques to subtract the background. For example, an image of the background without the face 56 is acquired. The image of the face and background is then subtracted from the background (block 58). The result is the facial image without the background 60. In step 61 standard, non-adaptive edge detection image processing techniques are used to determine a very coarse location of the silhouette of the face. It is coarse because this outline is affected by hair, clothing, etc.

Next the image is scaled down, for example, by a factor of 20 (block 62). This would reduce a 100 pixel by 80 pixel image down to 5×5. The images is then scaled down. For example, the total resulting image may include the following scales: 5×5, 6×6, 7×7, 10×10, 12×12, 16×16 and 18×18. This results in a hierarchy of resolutions. With regard to scaling it should be noted that the convolution types and sizes are identical for all images at all scales; and because they are identical, if the images are first scaled down to have coarsely scaled inputs then the convolutions will yield a measure of more coarse features. Conversely, if higher resolution inputs are used (with the same size and type kernel convolution) then the convolution will yield finer resolution features. Thus, the scaling process results in a plurality of features at different sizes. Accordingly, the next step is to perform a convolution on the scaled image in block 64. For example this may be a 3×3 convolution. In the preferred embodiment the convolutions used have zero-sum kernel coefficients. Also, a plurality of distributions of coefficients are used in order to achieve a plurality of different feature types. These may include, for example, a center surround, or vertical or horizontal bars, etc. This results in different feature types at each different scale. Steps 62 and 64 are then repeated for a plurality of scales and convolution kernels. This results in a feature space set 66 composed of a number of scales ("S") a number of features ("F") based on a number of kernels ("K"). This feature space then becomes the input to a neural network 68. In the preferred embodiment this comprises a conventional single layer linear proportional neural network which has been trained to produce as output the coordinates of the four corners of the desired bounding box 72 when given the facial outline image as input.

A description of a neural network suitable for this purpose may be found in the article, M. Kuperstein, "Neural Model of Adaptive Hand-eye Coordination For Single Postures", SCIENCE Vol. 239 pp. 1308–1311 (1988), which is herein incorporated by reference. Optionally, a hierarchical approach may be employed in which the feature space is transformed by a series of neural networks into bounding boxes that are increasingly closer to the desired bounding box. That is, the first time through the first neural network the output is a bounding box which is slightly smaller than the perimeter of the image and that box is clipped out and the features redefined and put into another neural network that has an output which is a bounding box that is a little closer to the desired bounding box. By repeating this process interactively until the final desired bounding box achieved, it has been found that the amount of noise with each iteration was reduced and the result is a more stable convergence to the desired bounding box with each neural network. Adequate results have been achieved in this manner with a hierarchy of two neural networks. In the preferred embodiment weights in the neural network 33 are assigned according to the techniques shown in FIG. 5 and discussed below.

Figure 4:
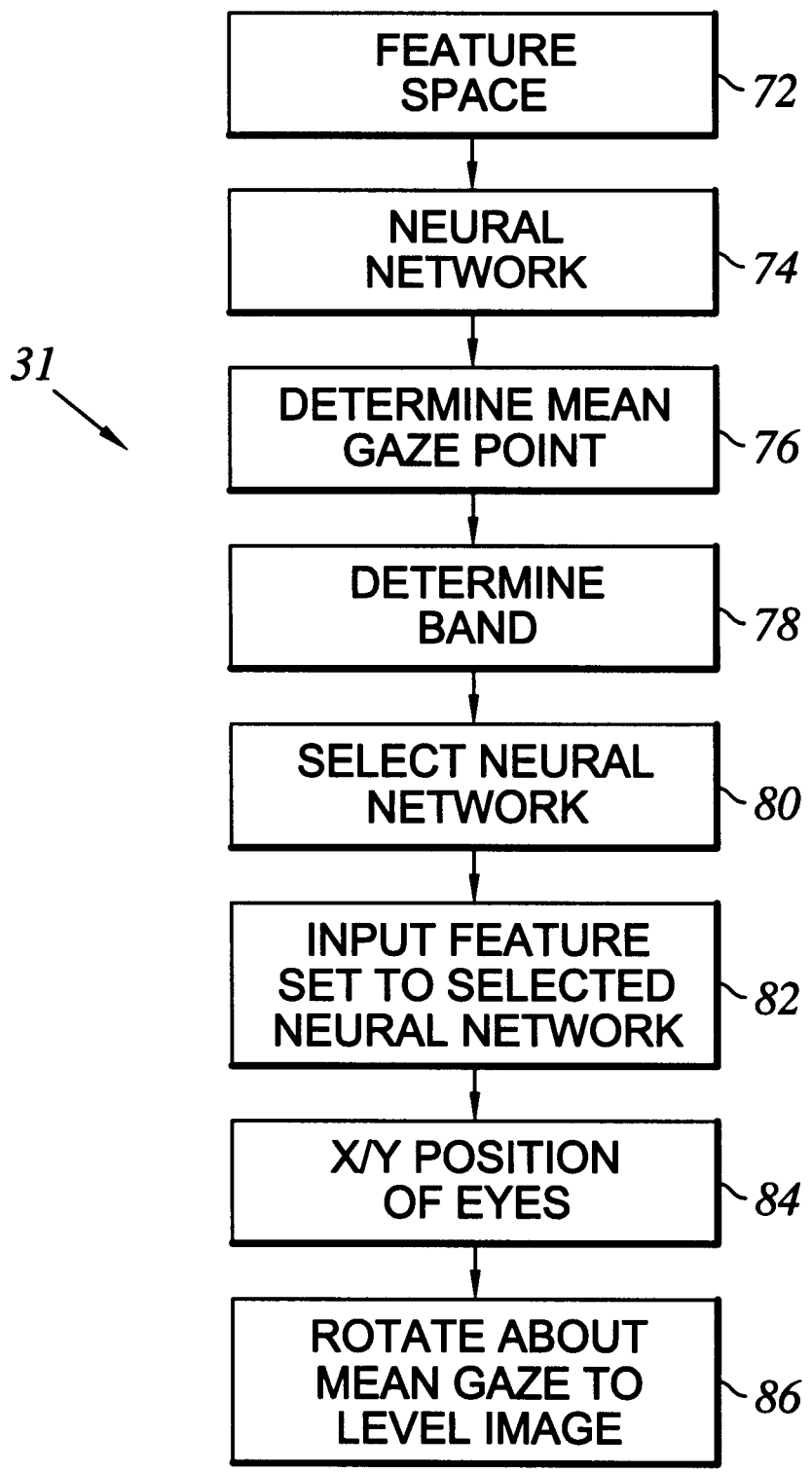
FIG. 4 is a diagram of the major steps involved in locating the eyes in a facial image in accordance with the present invention.

Referring now to FIG. 4, the process of locating the face 26 within the bounding box is shown. The general approach of the present invention is to locate with some precision a given feature on the face and register the corresponding features in the reference and test images before preforming the comparison process. In the preferred embodiment the feature used is the eyes. It will be appreciated that the eyes can be difficult to locate because of various factors such as reflections of light from glasses, from the eyes themselves, variations in shadows, etc. Further, the size of the eyes, their height, and other factors are all unknown. Because of this, an adaptive neural network is used to find the location of each of the eyes.

In more detail, first, the data outside the bounding box in feature space 66 (shown in FIG. 3) is eliminated. This feature space 72 (shown in FIG. 4) is input into a neural network 74 which has been trained to generate the x coordinate point of a single point, referred to as the "mean gaze". The mean is defined as the mean position along the horizonal axis between the two eyes. That is, the x position of the left and right eye are added together and divided by two to derive the mean gaze position. The neural network 74 may comprise one similar to the neural network 68 shown in FIG. 3, This neural net 74 is trained with known faces in various orientations to generate as output the location of the mean gaze. In the preferred embodiment weights in the neural network 74 are assigned according to the technique shown in FIG. 5 and discussed below.

Once the mean gaze is determined 76, a determination is made of which of five bands along the horizontal axis the gaze falls into. That is, a number of categories of where the gaze occurs are created. For example, these categories may determine whether the gaze occurred relatively within the middle or relatively in the next outer band, or in a third outer band of the total width of the face. These bands are not necessarily of equal width. For example, the center band may be the thinnest, the next outer ones a little wider and the final ones the widest. Wherever the computed mean gaze is located on the x coordinate will determine which band it falls into (step 78). Further, this will determine which of five neural networks will be used to find the location of the eyes. (step 80) Next, the feature set is input to the selected neural network in step 82. This neural network has been trained to determine the x and y coordinates of eyes having the mean gaze in the selected band 84.

The use of a plurality of neural networks for the different bands has the effect of making the inputs to each of the networks with respect to themselves much more similar. This is important because of the highly variable appearance of faces depending on whether the gaze is forward, leftward or rightward. By the use of a hierarchy of neural networks which each correspond to a certain range of the gaze of the face the inputs to each of the networks with respect to themselves are much more similar.

Next, the entire face is rotated (in two dimensions) about the gaze point until the x and y position of the eyes are level on the horizontal axis in step 86. The gaze point becomes a reference point for registration of the test and reference images as indicated in step 88 in FIG. 2.

Next, the feature sets are normalized 90 (shown in FIG. 2). This is accomplished by, for example, normalizing each feature value by the mean amplitude of all feature values. This normalization process normalizes against variations such as lighting conditions so that the feature set used in the neural network can withstand varying contrast or lighting conditions.

Next, in step 36 (in FIG. 2) the feature values are assigned to weights in the neural network 38. The preferred approach (for neural network 38, as well as for neural networks 26 and 30) will be to quantize the feature values from an analog number to a quantum number that is positive or negative. This is done by taking the whole range of values of all sets and quantize the range by certain ratios of twice the mean (positive and negative). Next, the positive feature value are ranked and the negative feature values are ranked with respect to their values. A set of positive ranks and a set of negative ranks are thereby defined. For a given feature value it can be assigned to a bin that is quantized by ranking the values. In the preferred embodiment this is done by defining the ranks by the fractions ⅓ and ½. In particular, all of the elements in the input vector (which comprises both positive and negative numbers) are used to determine their positive mean and their negative mean. For example, twice the positive mean may be 1000 and twice the negative mean may be 1500. Applying the fractions of ⅓ and ½ to 1000 would equal 333 and 500. Thus the first rank would equal components from 0333 the second rank between 334–500 and the third rank would be components greater than 500. Next, all the individual components of the input vector are placed in one of the three ranks based on their value. The same process is also performed for the negative components in the feature vectors, Next, each ranked component value is assigned a weight based on it's rank. This process of assigning weights is described in more detail in FIG. 5. There are 6 bins, each bin corresponding to a weight. There are 3 negative and 3 positive bins throughout the total range of component values of −800 through +800. A four by four weight lookup table vector 92 is shown which contains 16 components of the feature vectors. For example, one of these components is 600, another is 400, another is −100. Also, a four by four weight vector 94 is depicted. Each of the 16 weight locations in the four by four weight vector 94 correspond to one of the 16 components of the feature vector. Each location in the weight vector has six different weights corresponding to six different ranks.

In this example, there are three positive ranks and three negative ranks. As described above, each component in the feature vector is ranked. For example, 400 is determined to be of rank five, thus this component is mapped to the 5th of six weights within the corresponding location in the four by four weight vector 94. Similarly, the component having a value of 600 is put into the 6th rank and accordingly this feature vector is assigned to the weight value which exists in the third rank of its corresponding location of weight vector 94. The component having a value of −100 is assigned to the 2nd rank.

This process is repeated for all of the components of the feature vector. In an actual image, however, the feature vector may have many more components. There may be, for example, 10,000 components in the feature vector.

It should be noted that some components of feature vector may have a value of zero. When features values equal zero the system can decide to put these values in a bin or not. This decision is made differently for different neural networks. For the networks used to locate the bounding box 26 and the eyes 30, feature values of zero are not used. However, for the matching neural network 38 feature values of zero are used for weights associations. This is because with the bounding box or the eyes the output of the neural net is a coordinate value and it is not desirable to have a non-feature contribute to the location of an x,y point. However, when the feature value for the face verification neural network 38 is zero, it is desirable to have that contribute to the result. For example, in a face, the absence of a feature (zero feature value) is an important indicator of a mismatch, whereas the absence of a feature is not important to locate the bounding box or the eyes. A non-zero value for a feature vector component means that a feature has been measured at that location while a zero indicated that no feature has been measured at that location.

It should also be noted that the actual values of the selected weights in the vector are adaptive and will be modified during training as described in more detail below.

Also, the exact weight chosen in the weight vector will depend on the preexisting value of that weight vector component. However, there is a fixed relationship between each location in the feature vector and the corresponding location in the weight vector (each of which has multiple weights, one for each rank).

Once the weight vector 94 has been determined for both the reference set and test feature set the neural network 38 computes the normalized dot product of the two weight vectors. In essence, this operation computes the sum of the products of corresponding elements of the two weight vectors. This is operation 44 shown in FIG. 2. It will be appreciated that the dot product output will be a number which is proportional to the similarity between the two weight vectors. That is, highly similar weight vectors are more parallel and will yield higher dot product outputs indicating that the faces are similar. Dissimilar weight vectors will yield lower valued dot product outputs indicating that the faces are less similar.

The fact that the dot product operation is a "normalized" dot product means that the dot product of the output 46 is normalized to the unit circle in N dimensional space. The normalization process is performed by dividing the dot product by the product of each of the vector lengths. The normalized dot product results in a confidence level and that confidence level is normalized by a linear transformation constant to get the range needed, i.e., 0–10 or 0–100. If the confidence measure is above a preset verification threshold then the result is "positive". This means that the face in the test clip 32 depicts a face belonging to the same person as that in the reference clip 33. If the value is not above the predetermined threshold the result is "negative," which means that the test clip 33 and reference clip 32 depict faces of different people.

The procedure for training the neural network 38 to correctly perform the face matching procedure will now be described. Initially all of the weights are set to zero.

When two training facial images are input into the system, since all the weight values are zero the resulting dot product of the two weight vectors will also be zero. Because this is training data however it is known whether the two faces are from the same person or not. If they are from the same person then it is desired to have the result be a relatively high valued positive number. This is because matching feature vectors should produce above threshold outputs. The threshold may be selected arbitrarily to be at the midrange. When the two faces are from the same person, a starting positive value is selected and the two weight vectors are made to be the same positive value. If the two faces are from a different people then each weight value is given opposite assigned values, one starting value is positive and one is a negative but equal value.

Subsequently the neural network will be trained on many examples of pairs of faces, some of which match, and some of which do not match. A variety of faces in a variety of orientations and lighting conditions will be used to allow the neural network to generalize all of this information. As a result it will be able to recognize when two different views of the same person are actually the same person, and when two images of different people are in fact faces of different people.

The learning algorithm used in the preferred embodiment is as follows:

1. If the output 46 is correct make no changes to the weights. That is, a correct result means that two faces that are the same generate an output which is above threshold, and two faces which are from different persons generate an output that is below threshold.

2. If the result is negative (below threshold) and incorrect, adapt corresponding weights and weight vectors 1 and 2 to be closer to each other. The amount of adjustment is preferably a percentage of the difference between the two weights. This percentage is the learning rate for the adaptation. It should be noted that only weights which are selected by the feature sets 1 and 2 are adapted; non-selected weights are not. As discussed above, if both weight values are zero, (as in the initial condition) both weight values are changed to be a preset constant value.

3. If the output 46 is positive (above threshold) and incorrect, adapt the corresponding weights in weight vectors 1 and 2 to be farther from each other. Again, the amount of adjustment is a percentage of their difference. Only weights which are selected by the feature sets are adapted. If both the weight values are zero, the weight value of weight set 1 is set to the same preset constant value used in training step 2 above. However, the weight value from weight set 2 is set to the negative of this value.

The test images should comprise of pairs of randomly selected images of faces. Also, images of the same person should be used approximately half the time and images of different persons should be used about half the time. The objective of training is to give the system enough training with different orientations and different head postures etc. so it will be able to generalize across different head orientation and head postures. Thus, the training example will include examples of a head looking straight, to the left, to the right, up and down.

For example, the system may be trained with images of 300 different people in different orientations. It is being trained not to recognize any specific face but instead it is being trained to recognize what is similar about different images of the same face. It is being trained to be a generalized face recognizer as opposed to being able to recognize any specific face.

In a preferred embodiment, hysteresis is used during learning. This means that to avoid learning the result must be above or below the threshold by a given amount. For example, if two test images are from the same face, and the threshold is defined as an output of 5 on a scale of 0 to 10, then to avoid learning the output must be 5+delta. Thus any output less than the threshold of 5+delta will cause the system to adapt weights to be closer to each other. In this way, only results which are less ambiguously correct will avoid learning. Results which are correct, but only slightly above threshold will be further refined by additional training.

Likewise, when the system is trained with two training images of different faces, in order to avoid adaptation of the weights, the result must be below threshold by a given amount, for example below 5 minus delta. As a result any output above 5 minus delta will result in adaptation of the weights to produce less ambiguous results. In a preferred embodiment the delta amount used for the learning hysteresis may be 0.5. It should be remembered that this hysteresis is only used during the training procedure and not during actual use of the system on unknown faces. Thus, in actual use, where it is not known beforehand whether the faces match or not, any above threshold output will be considered to be a match and any result which is at or below threshold will be considered to be no match. It should be noted that the weights are always associated with a certain location in the neural network 38 and a certain feature of the neural network. However, every face is different so every image that comes from a different face will pick up different weights. But the weights themselves are always associate with a certain location and with a certain feature even though which weights are actually picked up depends on which face is being processed. As a result, the entire neural network will begin to average over all faces it has ever seen in it's experience.

It should also be noted that the operations of the neural network 38 in accordance with the present invention is quite different from the prior techniques, such as the self-organizing maps of Kohonen as described, for example in the article R. Lippman, An Introduction to Computing with Neural Networks". IEEE ASSP Magazine, April 1987, pp 4–2, which is incorporated by reference. Those skilled in the art will appreciate that with the Kohonen method a dot product is taken between a single input and the weight vector in the neural network. The weight vector which generates the highest dot product is designated the "winner" and that weight vector is modified during training to be even closer to the input vector.

In contrast, in the present invention two inputs operate on the neural network simultaneously instead of just one. Further, in the present invention, each input vector selects weights in the neural network and the dot product between each of the two selected weight vectors is determined. During learning, in the present invention, both sets of weight vectors are adapted to be closer to each other or farther apart from each other. Thus it is important to recognize that the architectural and learning algorithm of the present invention are specifically adapted to perform a comparison between two inputs, unlike Kohonen network which is adapted to classify an input into one of several outputs or associate an input with an output. The Kohonen network does not perform the function of comparing the similarity between two inputs. Also, in the present invention the actual feature vector is never used in the dot product as its in Kohonen networks. In the present invention only weights are used in the dot product operation. Also in the Kohonen system initially the weights are set to random values; in the present invention weights are initially set to zero.

Another advantage of the present invention is that it can be trained to generate a high matching value for incompatible looking objects. This is a major advantage over prior art approaches to face recognition. For example, suppose input vectors one and two representing facial images were identical. If a dot product is performed on the two images and they are identical, the result would be very high. However, if the images are offset by even one or two pixels then the dot product will be very low because everything is misregistered. In contrast, with the technique of the present invention the system can be trained to generate a matching output for different appearing objects. For example, if the input images were of an apple and an orange each image would select weight vectors and those weight vectors would be trained on various images of apples and oranges to generate a high dot product value. Yet a dot product between the raw image of the apple and orange would yield a very low value.

This malleable nature of the present invention is important because the human face varies tremendously whenever the orientation and lighting etc. of the face is changed. The present invention achieves the goal of being able to match images that are in some ways incompatible. This approach works because it defers the dot product operation to a reference of the inputs (the weight vectors) and does not perform the dot product on the raw image.

Of course, there are limits as to how variable the inputs can be even with the present invention. If input images vary too widely the training process will average weights according too wide a variability and the results will be unsatisfactory. This is why it is important to reliably produce the registration of the images; for example by achieving a very good location of a particular feature (for example, the eyes). If instead this feature is mislocated the faces will be misregistered and the results will be less reliable.

Figure 6:
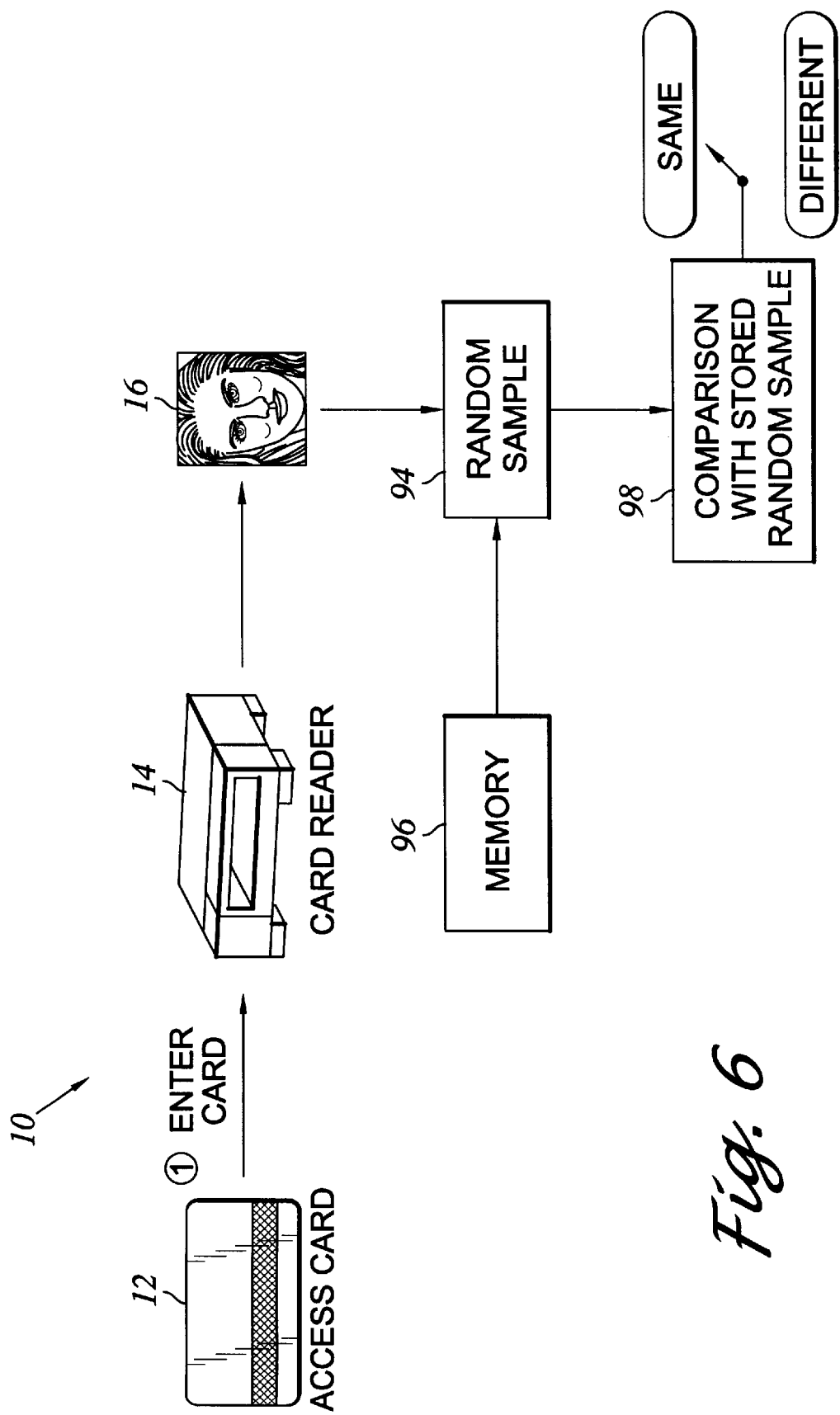
FIG. 6 is a diagram of an alternative embodiment of the present invention.

It should be noted that a system such as the one depicted in FIG. 1 can be tampered with if a fraudulent user is able to substitute his own image for the correct image on the access card. In this situation (assuming no prior storage of the facial image in a database), the system will compare the image on the card to the fraudulent user and will verify a match. A simple way to circumvent this problem is shown in FIG. 6. In effect, this approach utilizes the facial image as a personal identification number (PIN number). This may be accomplished by taking a predetermined random sample of values of the picture that was taken of the correct user during his enrollment. This random sample of values from the image is then stored in a database. If a fraudulent user then puts his picture on the card the random sample of the image will be scanned and it will be noted that they are different from the ones in the database and the card will be rejected. For example, as shown in FIG. 6 the access card 12 is entered into the card reader 14 which reads and digitizes the image 16 on the card. A random sample of this image is then taken by the module 94. Previously, a random sample of a reference image of the known user's face has been acquired and stored in memory unit 96. This may be done by entering the reference image into the card reader and transmitting the digitized image to the random sample unit 94, which then transmits the random sample to the memory unit 96. The two corresponding random samples (each associated with a common I.D. No.) are then compared in comparison unit 98. A match indicates that the faces are the same and the card is valid. No match indicates that the face on the card is not the same as the one previously stored and access will be denied.

It should be noted that while the position of the samples are determined randomly, the samples will always be in a repeatable location. For example, out of the entire image on the card the system may sample 24 locations in the image at random and each location may comprise a byte. Thus the total sample is 24 bytes. For each byte the system may sample a random bit position (yielding a zero or one) which would yield 24 bits of information, or three bytes. The ID number may also comprise about three bytes of information. This would yield a total of six bytes; three for the ID number, and three for the face pin number. As a result, with such minimal storage requirements it would be possible to put all the conceivable users of a given system on a single disk. For example six bytes for forty million users would fit on a single disk. This disk could then be distributed on a read only form to all the locations that required access checking.

In this way the image on the card itself is used as a PIN number. Two checks will be made before access is allowed. The first check occurs when a random sampling of the image on the card alone is taken and checked with the previously stored random sampling of the same image on the card. If there is no match access is denied because the card is invalid. The second check is when the live face of the person desiring access is compared to the image on the card and access is only allowed if a match is found.

It will be appreciated that the technique for using a face image on a card as a PIN number as described above and shown in FIG. 6 can also be used alone, without the face matching system for checking the live image of the user's face. For example, in applications where it is desirable to simply check the validity of a card having the user's face imprinted on it, the system shown in FIG. 6 will insure that the face on the card is the same one previously stored and that the card in not fraudulent.

Figure 7:
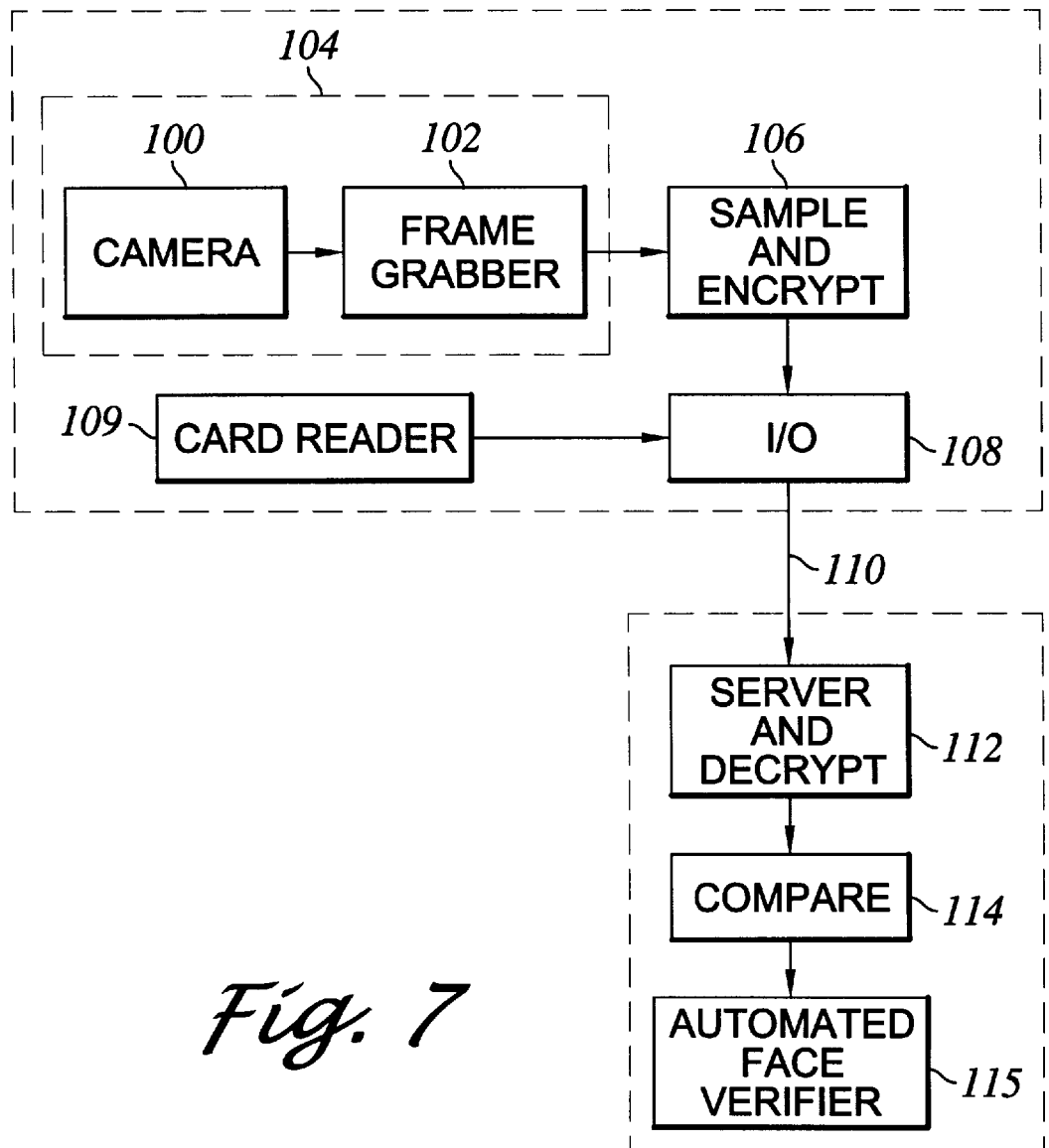
FIG. 7 is an alternative embodiment for using the present invention with a computer network.

It should be noted that the face recognition system 10 shown in FIG. 1 could be tampered with by a fraudulent user. For example, in some situations it may be possible to connect a VCR to the frame grabber 21 in place of the camera 20. Thus, an image of a the authorized user could be inserted in place of the actual fraudulent user. Other ways are also possible for a fraudulent user to insert the authorized user's image into the system, for example, by inserting an image directly into the automated face locator 26. For example, on systems such as those shown in FIG. 7 where the present invention is utilized by persons at remote locations it is desirable to insure that fraudulent users do not tamper with the signal which is transmitted remotely to the automated face verifier of the present invention. In accordance with an alternative embodiment of the present invention, the camera 20 and frame grabber 102 are enclosed in a tamperproof box 104. The tamperproof box 104 shown in FIG. 7 will comprise a conventional tamperproof box well-known in the art in which the components inside are disabled by a EPROM which erases if the box is tampered with. Also, within the tamperproof box is a special hardware device 106 which takes the live image and samples it in a manner similar to the technique disclosed above for using the facial image as a PIN number. That is, the image is sampled at, for example, 24 locations and these samples are put stored in three bites. These three bites are then encrypted by the sample unit 106 and the system using I/O unit 108 sends these encrypted samples along transmission line 110 to a remote server 112 which decrypts the sample. Also the server receives the live image from the camera and rechecks the live image with the decrypted sample in comparitor 114 to make sure that the two are identical.

In this way, the system insures that the live image is actually the image of the person who is actually there since the camera and frame grabber cannot be tampered with. It also insures that a fraudulent user has not inserted a fraudulent image of an authorized user at a point in the system down stream of the camera and frame grabber. Once this authentication process takes place, the automated face verifier of the present invention described above can then compare the live image with the image on the access card in accordance with the techniques discussed above.

In another alternative embodiment of the present invention a technique is employed for minimizing the variations in facial orientation when the image is acquired. When the camera 20 takes the picture of the person desiring access one approach would be to prompt the person (for example, by recorded voice command) to look into the camera while the picture is taken. However, it has been found that when prompted, people frequently will do things such as pose, assume and unnatural expression, adjust their hair, clothing, etc. The result is an unnatural and less consistent image. Further, the step of prompting and taking the picture takes time which slows down the process.

Also, there is added cost in the prompting mechanism.

To overcome these problems in the preferred embodiment, the camera is disposed to acquire the image of the person automatically when they initiate a certain action. This action may comprise, for example, the pressing of a key on the keyboard, inserting a card, an entry into a certain proximity of the access unit. By taking the picture in a candid way a more natural and consistent expression and pose will result. For example, when a person is pressing keys on a keyboard they are very likely to be looking directly at the keyboard with a neutral expression. This reduces variations in the facial expression and orientation. Also this approach eliminates the cost of the system and increases the speed of the recognition.

It should be noted that the above described techniques have been described in connection with the problem of matching facial images. However, the same techniques may easily be adapted to other patterned images and object patterns. These may include, for example, voice prints, finger prints, chromosomal and DNA patterns, etc. That is, these techniques are useful for any application where there is something about a pattern that is identifiable with a person (or other entity) and it is desirable to easily and automatically determine whether a test pattern matches that of a reference patterned image.

Also, it should be noted that while the feature sets are derived in the above discussion using convolutions and scaling, other known techniques may also be employed with the teachings of the present invention. For example, the feature sets may be derived using morphological operations, image transforms, pattern blob analysis, and eigenvalue approaches.

Further, while the preferred embodiment employs neural networks to perform verification, other adaptive processors could be used including, but not limited to, genetic algorithms, fuzzy logic, etc. In general adaptive processors are those which can perform facial verification for faces that vary by head orientation, lighting conditions, facial expression, etc., without having explicit knowledge of these variations. Thus, one could substitute another type of adaptive processor for the neural network in the present invention.

It will also be appreciated by those skilled in the art that all of the functions of the present invention can be implemented by suitable computer programming techniques. Also, it will be appreciated that the techniques discussed above have applications outside facial recognition and matching.

Those skilled in the art can appreciate that other advantages can be obtained from the use of this invention and that modification may be made without departing from the true spirit of invention after studying the specification, drawing and following claims.

What is claimed is:

1. A system for determining the likelihood that two object patterns arise from the dame object source, said system comprising:
   a. means for receiving first and second object patterns each including a plurality of feature components having a plurality of values;
   b. Means for assigning a predetermined weight to each said feature component in each of said object patterns, wherein the assigned weights are one of a plurality of weights in corresponding first and second weight sets in a neural network, wherein each weight set includes a plurality of weight subsets, each weight subset corresponding to the location of one of said feature components, wherein particular weights in each subset are assigned according to the value of the component; and
   c. means for determining an output of said neural network by calculating a comparison function of the assigned weights in the two respective weight sets, wherein the values of the weights are predetermined such that the output is a measure of the likelihood that two object patterns arise from the same object source, wherein the value of said predetermined weights are derived from a training procedure and are independent of the value of the feature component.

2. The system of claim 1 further comprising a learning unit which comprises:
   means for generating sets of training pairs of first and second training object patterns derived from known object sources, the training pairs comprising first and second training object patterns that vary from each other, some of which derive from the same object source;

means for adjusting the value of said assigned weights of the first and second weight sets to have a greater difference for said training pairs arising from two different object sources that generate an output incorrectly indicating the same source; and means for adjusting the value of said assigned wights of the first and second sets to have a smaller difference measure for said pairs arising from the same object source that generate an output incorrectly indicating different sources.

3. The system of claim 1 further comprising:
   means for defining a bounding region around said object pattern within a larger pattern, the region wherein portions outside of the bounding region are discarded.

4. The system of claim 3 further comprising a neural network for deriving the location of said bounding region adaptively.

5. The system of claim 3 wherein said object patterns each comprise human facial images and further comprising
   means for locating the position of the eyes in said human face; and
   means for rotating the facial image about a fixed point until the eyes are level horizontally, and registering the two object patterns based on said eye positions.

6. The system of claim 1 further comprising:
   means for discretizing each feature value in discrete bins as a function of the value's proportion of the mean of the feature values; and
   means for assigning each feature value to one of a set of possible weight values in said weight set based on said discretizing.

7. A method for determining the likelihood that two object patterns arise from the same object source, said method comprising:
   a. receiving first and second object patterns each including a plurality of feature components having different values;
   c. assigning a predetermined weight to each said feature component in each of said object patterns, wherein the assigned weights are one of a plurality of weights in corresponding first or second weight sets in a neural network, wherein each weight set includes a plurality of weight subsets, each weight subset corresponding to the location of one of said feature components, wherein particular weights in each subset are assigned according to the value of the component; and
   d. determining an output of said neural network by calculating a comparison function of the assigned weights in the two respective weight sets, wherein the values of the weights are predetermined such that the output is a measure of the likelihood that two object patterns arise from the same object source, and wherein the value of said predetermined weights are derived from a training procedure and are independent of the value of the feature component.

8. The method of claim 7 further comprising performing a training procedure to determine said weight values, the training procedure comprising the steps of:
   generating sets of training pairs of first and second training object patterns derived from known object sources, the training pairs comprising first and second training object patterns that vary from each other, some of which derive from the same object source;
   adjusting the value of said assigned weights of the first and second weight sets to have a greater difference measure for said training pairs arising from two different objects sources that generate an output incorrectly indicating the same source; and adjusting the value of said assigned weights of the first and second weight sets to have a smaller difference measure for said training pairs arising from the same object source that generate an output incorrectly indicating different sources.

9. The method of claim 7 further comprising:

defining a bounding region around said object pattern within a larger pattern, the region wherein portions outside of the bounding region are discarded.

10. The method of claim 9 further comprising a neural network for deriving the location of said bounding region adaptively.

11. The method of claim 9 further comprising:

locating the position of the eyes, by determining the average eye position; and rotating the facial image about the average eye position until the eyes are level horizontally, and registering the two object patterns based on said eye positions.

12. The method of claim 7 further comprising:

ranking each feature value as a function of the value's proportion of the mean of the feature values; and assigning each feature value to one of a set of possible weight values in said weight set based on said ranking.

* * * * *